(No Model.) 2 Sheets—Sheet 1.
M. G. KELLOGG.
MULTIPLE SWITCHBOARD.
No. 592,304. Patented Oct. 26, 1897.
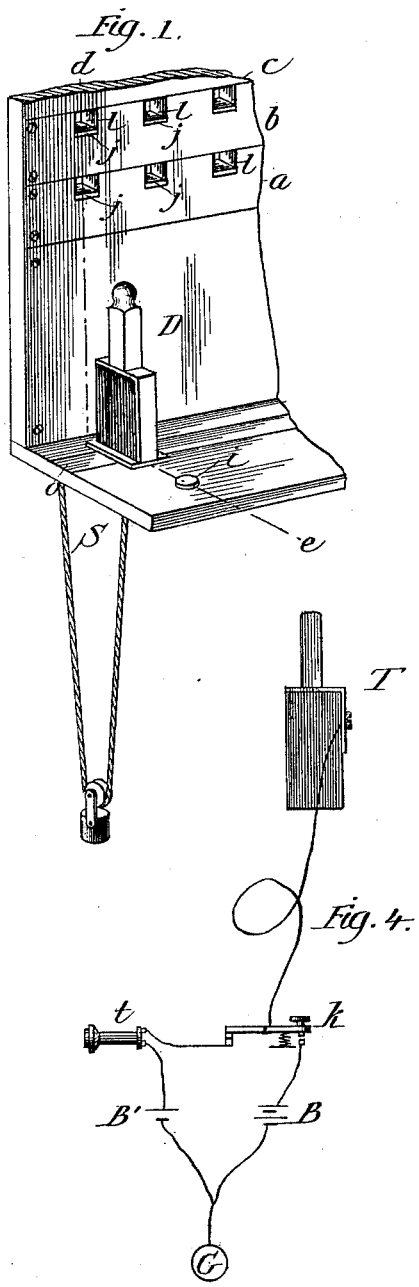
Witnesses:
Frank S. Blanchard
Milton Head
Inventor:
Milo G. Kellogg

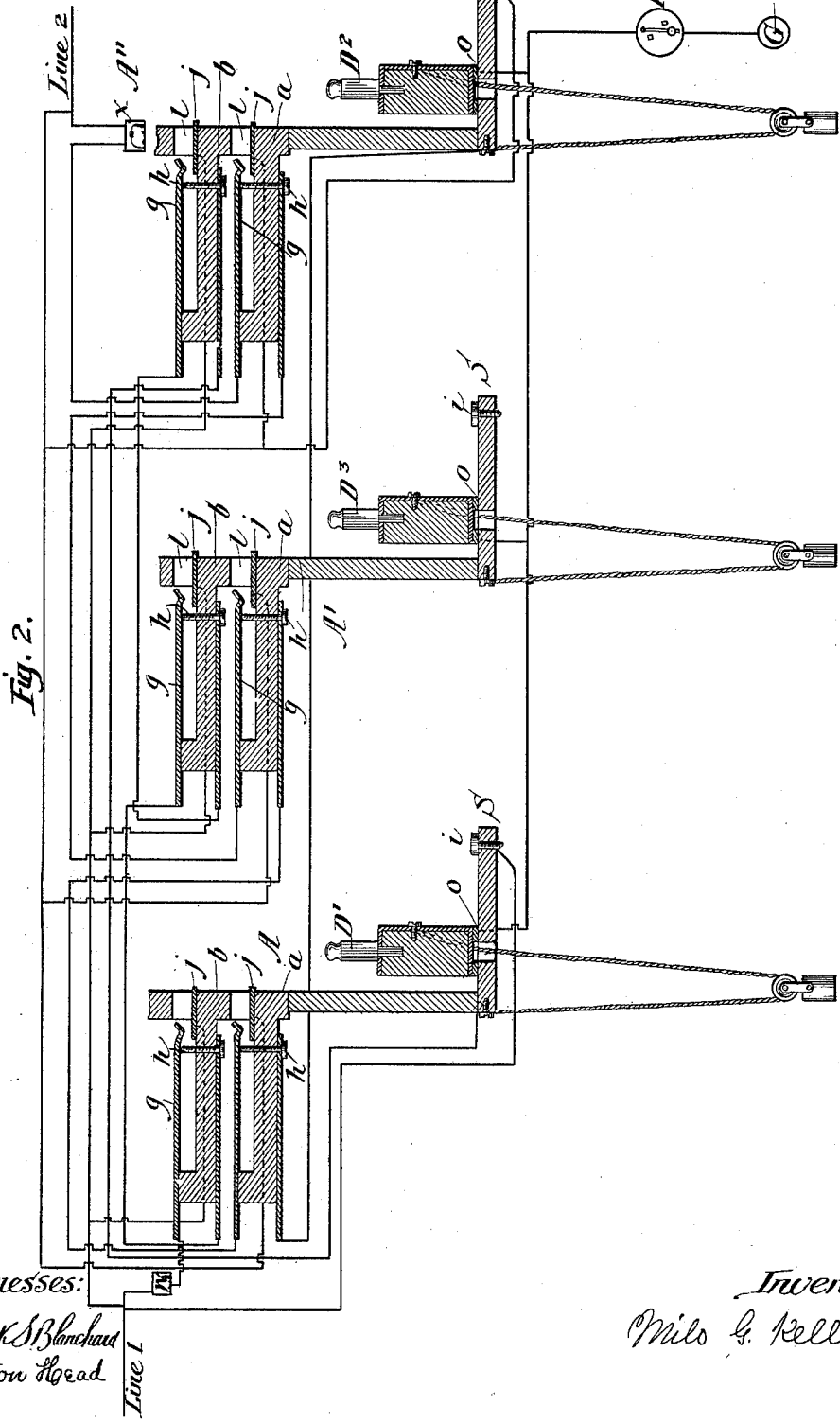

UNITED STATES PATENT OFFICE.

MILO G. KELLOGG, OF CHICAGO, ILLINOIS, ASSIGNOR TO THE KELLOGG SWITCHBOARD AND SUPPLY COMPANY, OF SAME PLACE.

MULTIPLE SWITCHBOARD.

SPECIFICATION forming part of Letters Patent No. 592,304, dated October 26, 1897.

Application filed November 8, 1887. Serial No. 254,586. (No model.)

*To all whom it may concern:*

Be it known that I, MILO G. KELLOGG, of Chicago, (Hyde Park,) Illinois, have invented certain new and useful Improvements in Multiple Switchboards for Telephone-Exchanges, of which the following is a full, clear, concise, and exact description, reference being had to the accompanying drawings, forming a part of this specification.

My invention relates to telephone-exchange systems in which the lines are normally grounded at the central office or connected together in a common return-circuit; and it consists of apparatus for operating a telephone-exchange of such lines with multiple switchboards and for determining at one board whether or not a line is in use at another board.

In my system I place as many multiple boards at the central office as are found necessary or desirable in order to answer the calls and make the connections, and at each board I place apparatus whereby any line may at the will of the operator be disconnected from the ground or the common return-wire and connected with any other line for conversation. In the common wire which connects all the lines to the ground or in the common return-wire, if one is used, I place a rheotome, which at short intervals breaks the circuit of or interrupts the continuity of said common ground or return wire. These interruptions are preferably of short duration and of frequent occurrence. At each board I place a test receiving instrument grounded at one side or connected to the common ground-wire or the common return-wire at such a point that the contact-points of the rheotome will be between said points and all of said lines, each test receiving instrument being connected on its other side to a switch testing device adapted to be brought into contact with any of said lines at its board whether the line is switched for conversation or not. There is also a battery in the circuit with each test receiving instrument between its said switching device and its ground connection or the point mentioned above where it is connected to the common ground-wire or to the common return-wire.

In my system each line may pass, at one of the boards, through a flexible conducting-cord and switch-plug, and the circuits and apparatus may be arranged so that when the plug is in its normal position, where the line is not in use, the line is grounded, and when the plug is taken from this normal position for the purpose of switching the line the ground is automatically removed from the line. At the boards each line passes through line-switches, preferably spring-jack switches, arranged so that when a switch-plug is inserted into a switch the line is disconnected from the ground and is connected to the switch-plug and its connecting-cord.

For each line I may use a calling-annunciator preferably located at the board where the conducting-cord and switch-plug of the line belongs. This annunciator for a line may be so placed in the circuit of the system and apparatus that when a switch-plug is placed in one of its line-switches it is shunted or switched from the circuit of the line, but otherwise it is in said circuit. It is evident that with the apparatus described above thus connected when the switch-plug of a line is removed from its normal position and is placed in the spring-jack switch of another line both lines are disconnected from the ground and they are connected with each other for conversation, the calling-annunciator of the line to which the plug belongs being in the circuit thus established, and the calling-annunciator of the other line being shunted or switched from the circuit.

In the drawings, Figure 1 is a front view of a section of one of the multiple switchboards of an exchange to which the same lines are connected. Fig. 2 shows a complete diagram with three boards of the main-line apparatus, circuits and connections necessary to operate my invention. Fig. 3 shows a mechanical rheotome or automatic circuit-interrupter such as may be used. Fig. 4 shows an operator's system of apparatus and circuits for receiving and answering calls, testing lines, and sending out signals and listening to see whether subscribers are through conversation, said system being adapted for use with the switchboard apparatus and connections mentioned above.

In the drawings like parts and apparatus are indicated by the same letters of reference.

In Fig. 2, A A' A'' are sectional views of three switchboards of an exchange system, being duplicates, and one of which is partly shown in Fig. 1, the section being as indicated by the lines $d\ e$.

$a\ b$, &c., in the drawings represent rubber strips on which the metal parts of the spring-jacks are mounted.

$l\ l$, &c., are rectilinear holes through the front of the switches, adapted to receive the switch-plugs.

$g\ g\ g$, &c., are the spring contact-pieces of the switches.

$h\ h\ h$, &c., are contact-points of the switches, on which the contact-springs $g\ g$ normally rest.

$j\ j\ j$, &c., are contact-pieces for the switches. Each switch may have a spring $g$, a contact-point $h$, a contact-piece $j$, and a hole $l$, all being so constructed and placed with relation to each other that when a switch-plug properly constructed is placed in the switch-hole it moves the spring from connection with the contact-point, and the contact-piece of the plug forms connection with the spring and also with the contact-piece $j$ of the switch. This contact-piece $j$ is also placed toward the front of the switch, so that the operator may readily connect her test-plug to it.

$D'\ D^2\ D^3$ are switch-plugs constructed substantially as shown and adapted to make the connections above described when inserted into a switch-hole.

S S S are shelves at the front of the boards, constructed to support the switch-plugs and other apparatus, as shown. $o\ o$ are contact-pieces mounted on said shelves, all connected to the ground through the rheotome mentioned above, adapted to support the switch-plugs and to form connection between their metal parts and the ground when the plugs are in their normal positions. Weights, as shown, or other devices may be employed to keep the cords taut and to form good connections between the plugs and the contact-pieces $o$.

$i\ i$, &c., are contact-bolts mounted on the shelves. There are as many switch-plugs and cords at each board as there are lines assigned to be answered and attended to at the board. There should be one contact-piece $i$ for each of said plugs. These contact pieces or bolts may be mounted on the shelves, as shown, or in any other convenient place.

$w\ x$ are calling-annunciators. $w$ is shown as located at board A, and its calls are to be attended to at that board. $x$ is located at board A''. Two lines are shown connected to the apparatus, marked line No. 1 and line No. 2. The annunciator $w$ and the plug $D'$ belong to line No. 1. The annunciator $x$ and the plug $D^2$ belong to line No. 2. The line-circuits are as shown and as will now be described. Line No. 1, for example, after entering the office passes through its calling-annunciator and thence successively through its spring-jack switches on the different boards, passing in each case to the spring first. The line also passes to its cord and through the plug to the ground connection. From a point between the subscriber's station and the line-annunciator, preferably, a wire is branched to all of the contact-pieces $j\ j$ of the switches of the line on the different boards and also to the contact-bolt $i$, which belongs to the line. All other lines are connected to their switches and apparatus in a similar manner. It is preferable, although not necessary, in the apparatus I have described that the cord of a line should be connected into its circuit after the line has passed through its switches.

R is the rheotome, connected as shown. This rheotome may be a mechanical rheotome similar to that shown in Fig. 3, or it may be of any usual forms of electric rheotome. The rheotome shown is a usual form of mechanical rheotome containing a clockwork movement actuated by a spring. It contains an oscillating bar fixed to the verge-shaft and standing at right angles to it. A pair of contact-points is connected with the bar or with the shaft in such a way that their connection is alternately made and broken with the oscillations. On the bar is a sliding weight by which the rapidity of the oscillations may be regulated. The pair of contact-points is properly insulated and is connected with the circuit as indicated for the rheotome. This rheotome operates continuously to make and break the circuit of the common ground-wire or of the common return-wire, as the case may be. The breaks should be of short duration. Otherwise when a signaling-current is sent from a subscriber's station it might not operate the calling-annunciator, as it might be of shorter duration than the break in the ground-wire. It is also desirable to have the breaks of frequent occurrence, so that an operator in testing may not lose time in listening to see whether her testing instrument is in the circuit with the rheotome.

In the operator's system shown in Fig. 4, $t$ is the operator's telephone. B is the calling generator or battery. B' is a test-battery. T is a connecting-plug with a flexible cord. $k$ is a calling-key. The circuits are substantially as shown. G in each case in the drawings represents a ground connection. There is one operator's test system for each operator.

It will be noticed in the apparatus described above that when a plug belonging to a line is taken from its support $o$ the line is disconnected from the ground, and that when the plug is inserted in the spring-jack of another line that line is also disconnected from the ground, and the two lines are connected together. It will also be seen that when the lines are thus connected together the annunciator of the second line is shunted and the annunciator of the first line is in the circuit. There will therefore be but one annunciator in circuit, that of the calling subscriber, to receive any clearing-out signals which may be sent over the circuit. It will also be noticed that all the contact-pieces $jj$ belonging to a line and its contact-bolt $i$ are connected to the line whether it is switched for conversation or not. Consequently when an operator's connecting-plug T is placed in contact with any of these pieces or bolts, whether it be for answering calls, for testing, for sending calling-signals, or for listening for conversation over the circuit in which the line is connected, the plug will never be unconnected with the line and fail to operate as intended. It will also be noticed that when any line is switched for conversation, either by its switch-plug being removed from its normal position or from a switch-plug being placed in one of its line-switches, the rheotome is entirely disconnected from the line and will not interrupt the conversation. The contact-pieces $jj$ and the bolt $i$ being then disconnected from the rheotome, the test receiving instrument when connected to any of these pieces will not indicate the interruptions of the ground-wire which would otherwise be indicated.

The operation of the system is as follows: When a calling-signal is sent in over a line, the operator removes the plug which belongs to the line from its normal position, thus disconnecting the line from the ground. He then places the plug T of his operator's system on the bolt $i$ belonging to the line and by listening finds out what line is wanted. He then places his plug T in contact with the piece $j$ of the switch of the line which is wanted, and if he hears in his telephone the usual sounds caused by the make and break of the rheotome when a line is being tested and is not switched he knows that the line is not in use and he places the plug of the line whose call he is attending to into the switch of the line he is testing, thus connecting the two lines together for conversation, with the calling-annunciator of the line which made the call in their circuit and the calling-annunciator of the other line shunted. If when he made the test he had not heard the sounds mentioned above in his telephone, he would know that the line was switched or in use at another board and would so announce to the calling subscriber, and would then replace the line-plug in its normal position. When the operator has completed the connection, as above described, he should bring the plug T into contact with the circuit of the two lines connected together by placing it against one of the contact-pieces $j$ or contact-bolts $i$ of either of the two lines, and should then press on the key $k$, and by so doing send a calling-current over both lines, thereby operating their bells and signaling to the called subscriber that he is wanted and to the calling subscriber that the connection is made.

When an operator tests, the test-circuit is as follows: from the ground or the common wire, as mentioned above, through the telephone or other test receiving instrument used and the test-battery to the contact-piece $j$ of the line tested, thence through the switches and cord of the line to the rheotome, and thence to the ground or common wire should the line tested not be switched. Should the line tested be switched at any board, the continuity of this test-circuit is broken and the telephone will not respond to the make and break caused by the rheotome. It is apparent that when the test is made for a line there is an unbroken circuit for the test-battery and test receiving instrument out over the line and to ground and back again. The test receiving instrument will on account of this give one click or sound when the plug T is applied to the piece $j$ of a line, even though it be switched for conversation. It will not, however, give the succession of clicks which he hears when the line is not in use. The test-battery being in the operator's local test-circuit normally open at one end is normally on open circuit, and there is not a continual consumption of battery-current and line-induction, as is the case in systems of testing in which a battery or the secondary of an induction-coil is placed in the common ground connection of the lines.

In single-cord systems heretofore devised the line-annunciators are located in the line-circuit between the switch-contacts on the one hand and the line-contacts on the other, and the annunciator of the called line is switched from its circuit when a plug is inserted into one of its switches, whereas in my system said annunciator is shunted from the circuit. One of the advantages incident to such a system is that when two lines of a multiple-board system are connected together for conversation there is a solid connection (instead of a connection through a series of pairs of normally-closed switch-contacts) to the line of the called subscriber.

I claim as my invention and desire to secure by Letters Patent—

1. In a telephone-exchange system, two or more lines centering at a telephone-exchange, a rheotome at the central office, a test receiving instrument connected on one side to one side of the rheotome and on its other side to a switch testing device adapted to be brought into connection with any line whether it is switched or not, and a battery in the test-circuit thereby established, in combination with a switch with a pair of contact-points normally in contact, and a flexible switch-cord with plug attached for each line said line passing through its pair of contact-points and thence to said cord, said plug being normally connected to a switching device which connects it to the other side of said rheotome and adapted to be taken from its normal position and placed in the switch of another line and thereby disconnect the two lines from their normal connection with the rheotome and connect them together, substantially as set forth.

2. In a telephone-exchange system, multiple switchboards, telephone-lines connected to the same, a rheotome at the central office, test receiving instruments, one at each board, each connected on one side to one side of the rheotome and on its other side to a switch testing device adapted to be brought into connection with any line whether it is switched or not, and a battery in the test-circuit thereby established, in combination with switches with pairs of contact-points normally in contact and flexible switch-cords with plugs attached, one switch on each board, for each line, and one cord with plug for each line, each line passing successively through its pairs of contact-points and thence to its cord, and said plug with cords being distributed among the boards and each plug being normally connected to a switching device which connects it to the other side of said rheotome and adapted to be taken from its normal position and placed in the switch of another line and thereby disconnect the two lines from their normal connection with the rheotome and connect them together substantially as set forth.

3. In a telephone-exchange system, two or more telephone-lines, a rheotome at the central office, a test receiving instrument connected on one side to one side of the rheotome and on its other side to a switch testing device adapted to be brought into connection with any of the test contact-pieces of the lines, and a battery in the test-circuit thereby established in combination with a switch and a flexible conducting-cord with a plug attached for each line, each switch having a line contact-piece connected to the line, and normally in contact with another contact-piece connected to said switch-cord and a test contact-piece connected with the line, and said plug being normally connected to a switching device which connects it to the other side of said rheotome and adapted to be taken from its normal position and placed in the switch of another line and thereby disconnect the line contact-piece of the switch from the contact-piece with which it is normally in contact and connect the line contact-piece with the contact-piece of the plug, substantially as set forth.

4. In a telephone-exchange system, multiple switchboards, telephone-lines connected to the same, a rheotome at the central office, test receiving instruments, one at each board, each connected on one side to one side of the rheotome and on its other side to a switch testing device adapted to be brought into connection with any test contact-piece at its board, and a battery in the test-circuit thereby established, in combination with switches, one for each line on each board and flexible switch-cords with plugs attached, one for each line, each switch having a line contact-piece normally in contact with another contact-piece and a test contact-piece connected to the line each line passing successively through the pairs of contact-pieces of its switches which are normally in contact and thence to the switch-cord, passing in each case to the line contact-piece of the switch first, said cords with plugs being distributed among the boards and each of said plugs being normally connected to a switching device which connects it to the other side of said rheotome and adapted to be taken from its normal position and placed in the switch of another line, and thereby disconnect the line contact-piece of the switch from the contact-piece with which it is normally in contact and connect the line contact-piece with the contact-piece of the plug, substantially as set forth.

5. In a telephone-exchange system, two or more telephone-lines, a rheotome at the central office, grounded on one side, and a test receiving instrument grounded on one side but not through the rheotome and connected on its other side to a switch testing plug or device adapted to be brought into connection with any test contact-piece of the lines, and a battery between the ground connection and said testing device, in combination with a switch and a flexible conducting-cord with plug attached for each line, each switch having a line contact-piece connected to the line and normally in contact with another contact-piece connected to said switch-cord and a test contact-piece connected to the line, and said plug being normally connected to a switching device which connects it to the other side of said rheotome and adapted to be taken from its normal position and placed in the switch of another line and thereby disconnect the line contact-piece of the switch from the contact-piece with which it is normally in contact and connect the line contact-piece with the contact-piece of the plug, substantially as set forth.

6. In a telephone-exchange system, multiple switchboards, telephone-lines connected to the same, a rheotome at the central office grounded on one side, test receiving instruments, one at each board, each grounded on one side but not through a rheotome and connected on its other side to a switch testing plug or device adapted to be brought into connection with any test contact-piece at its board, and a battery between the ground connection and the switch testing device, in combination with switches, one for each line on each board, and flexible switch-cords with plugs attached, one for each line each switch having a line, contact-piece normally in contact with another contact-piece and a test contact-piece connected to the line, each line passing successively through the pairs of contact-pieces of its switches which are normally in contact and thence to the switch-cord, passing in each case to the line contact-piece of the switch first, said cords with plugs being distributed among the several boards and each of the plugs being normally connected to a switching device which connects it to the other side of the rheotome and adapted to be taken from its normal position and placed in the switch of another line and thereby disconnect the line contact-piece of the switch from the contact-piece with which it is normally in contact and connect the line contact-piece with the contact-piece of the plug, substantially as set forth.

7. In a telephone-exchange system, two or more telephone-lines in combination with a line-switch, a flexible cord with plug attached and an annunciator for each line, each switch having a line contact-piece connected to the line normally in connection with another contact-piece connected to the switch-cord and a third contact-piece also connected to the line, and the annunciator normally in the circuit of the line between said line contact-piece and the connection of the line with said third contact-piece, each plug being adapted to be inserted into the switch of any other line and when inserted to disconnect the two contact-pieces which are normally in contact, and connect the contact-piece of the plug with said line contact-piece and with said third contact-piece of the switch, substantially as set forth.

8. In a telephone-exchange system, multiple switchboards, and telephone-lines, in combination with switches, one for each line, on each board, switch-cords with plugs attached and annunciators, one cord and one annunciator for each line, each switch having a line contact-piece normally in connection with another contact-piece and a third contact-piece, each line passing successively through the pairs of contact-pieces of its switches which are normally in contact and thence connected to its switch-cord, passing in each case to the line contact-piece first, said third contact-pieces of the switches of a line being connected to the line and the annunciator of the line being normally in its circuit between its point of connection with said third contact-pieces and its pairs of switch contact-pieces, said plugs being distributed among the boards and each adapted to be inserted into any switch at its board and when inserted to disconnect the contact-pieces which are normally in contact and connect the contact of the plug with said line contact-piece and with said third contact-piece of the switch, substantially as set forth.

9. In a telephone-exchange system, two or more telephone-lines, in combination with a line-switch, a flexible cord with plug attached and an annunciator for each line, each switch having a line contact-piece connected to the line and another contact-piece also connected to the line, and the annunciator normally in the circuit of the line between said line contact-piece and the connection of the line with said other contact-piece, each plug being adapted to be inserted into the switch of any other line and when inserted to connect the contact of the plug with said line contact-piece and with said other contact-piece of the switch, substantially as set forth.

10. In a telephone-exchange system, multiple switchboards, and telephone-lines, in combination with switches, one for each line, on each board, switch-cords with plugs attached and annunciators, one cord and one annunciator for each line, each switch having a line contact-piece normally connected with the line and another contact-piece, said other contact-pieces of the switches of a line being connected to the line and the annunciator of the line being normally in its circuit between its point of connection with said other contact-pieces and its line contact-pieces, the plugs being distributed among the boards and each adapted to be inserted into any switch at its board and when inserted to connect the contact of the plug with said line contact-piece and with said other contact-piece of the switch, substantially as set forth.

Witness my hand this 5th day of October, A. D. 1887.

MILO G. KELLOGG.

Witnesses:
   CALVIN DE WOLF,
   MILTON HEAD.